S. LAKE.
INTERNAL COMBUSTION ENGINE.
APPLICATION FILED NOV. 20, 1915.
1,276,083.
Patented Aug. 20, 1918.
3 SHEETS—SHEET 2.
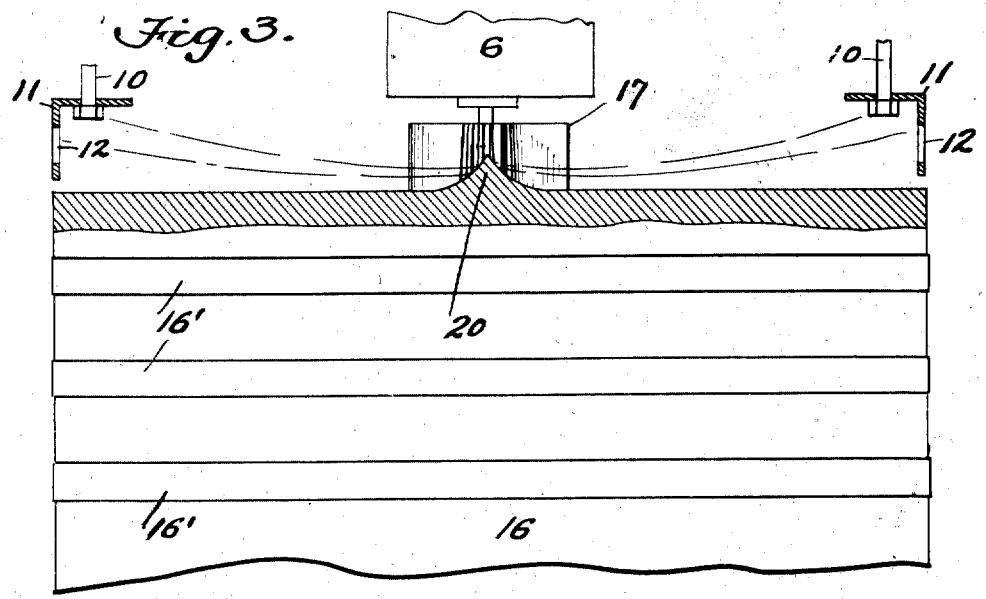
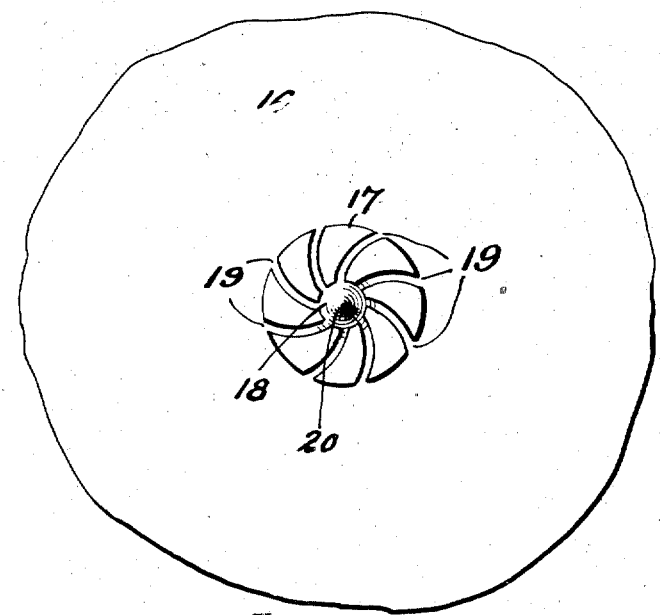
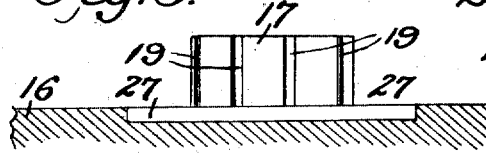
Witnesses
M. E. Hitchcock
Carl F. Davis
Inventor
Simon Lake
by Mercer D. Blondel
Attorney

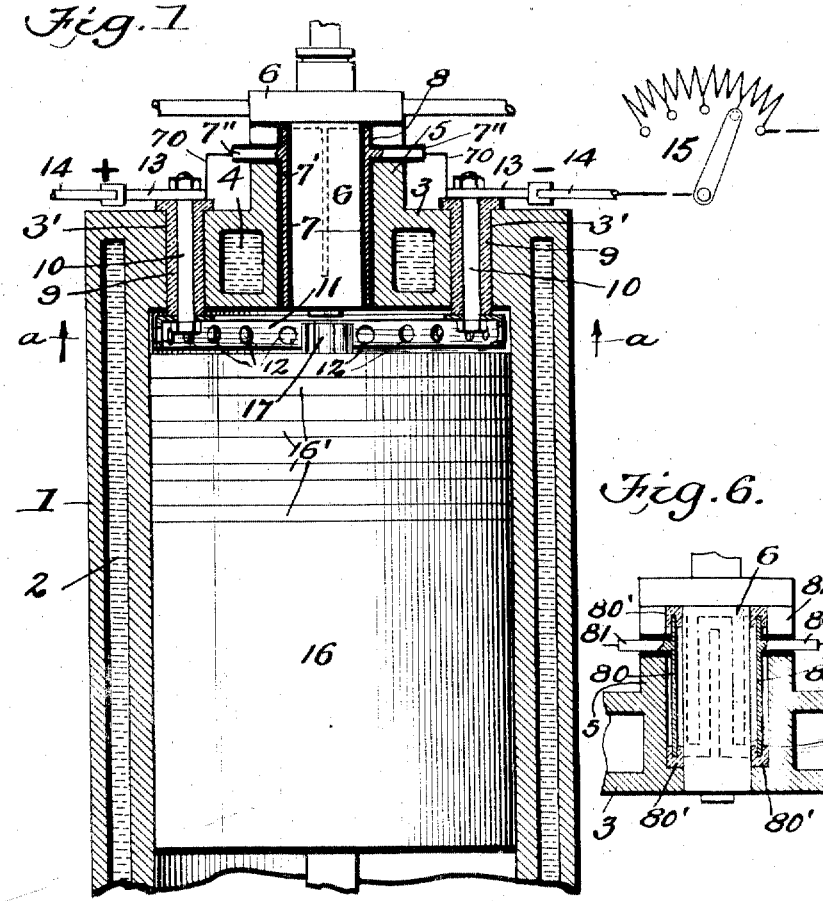
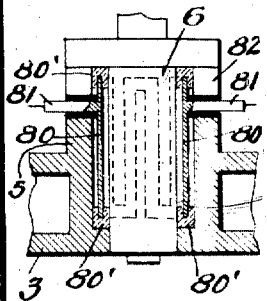
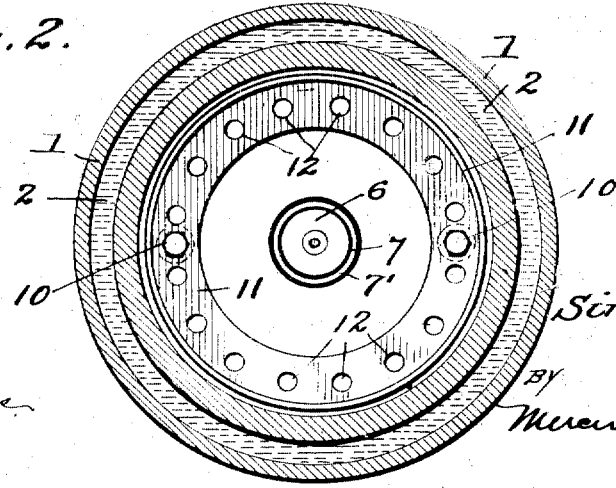

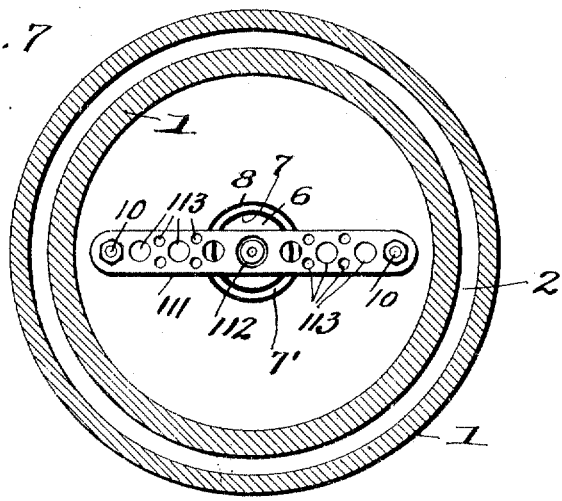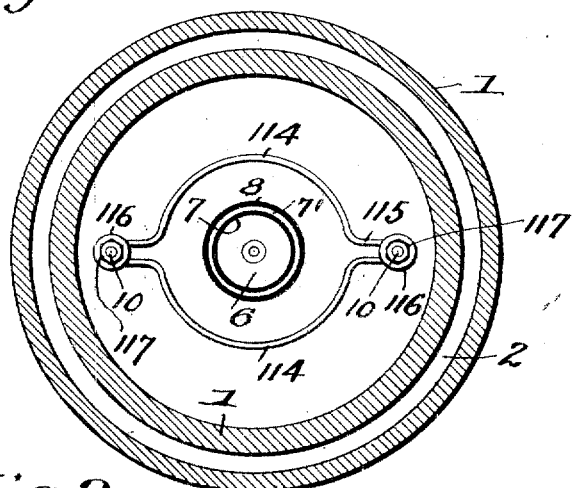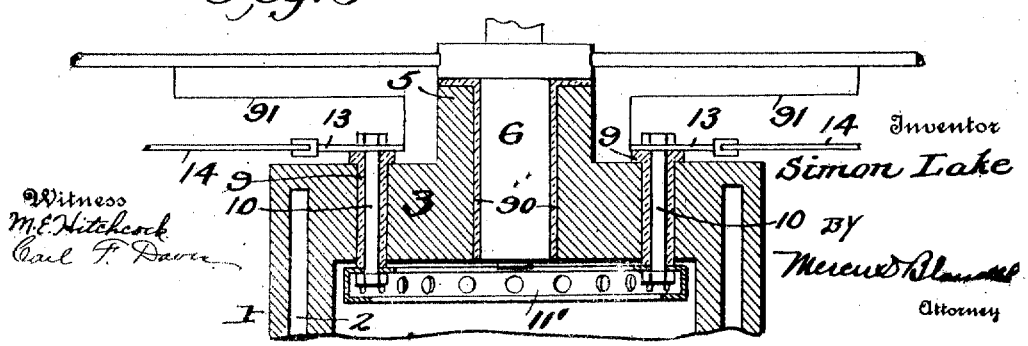

UNITED STATES PATENT OFFICE.

SIMON LAKE, OF MILFORD, CONNECTICUT.

INTERNAL-COMBUSTION ENGINE.

1,276,083.  Specification of Letters Patent.  Patented Aug. 20, 1918.

Application filed November 20, 1915. Serial No. 62,549.

*To all whom it may concern:*

Be it known that I, SIMON LAKE, a citizen of the United States, residing at Milford, in the county of New Haven and State of Connecticut, have invented certain new and useful Improvements in Internal-Combustion Engines, of which the following is a specification.

This invention relates to certain improvements in internal combustion engines of the heavy oil type, and particularly to that class of engines shown and described in Letters Patent granted to me July 15, 1913, No. 1,067,258, and my co-pending application, filed May 16, 1914, Serial No. 839,158.

The object of the invention is to provide means within the combustion chambers of the cylinders of internal combustion engines for raising the temperature within the combustion chamber prior to the starting of the engine, so that, when the first charge of fuel is injected into the combustion chamber, it will be instantly ignited and burned, means being carried by the power piston for breaking up, and for distributing and directing the fuel against the heating means, so as to insure the ignition of the fuel as it is injected into the combustion chamber at more than one point therein, and consequently effect the complete burning of the entire charge of the fuel, thereby economizing in the operation of the engine. A further object of the invention is to provide means for heating the charge of fuel prior to its injection into the combustion chamber.

The invention consists in arranging an annulus, plate, or wire, of high resistance material, (such as "nichrome," for instance), within the upper end of the combustion chamber, and in connecting the said annulus, plate, or wire, with the positive and negative terminals of a suitable source of electric energy of sufficient capacity to supply the necessary current for making the resistance material iridescent or incandescent, so that, when the said resistance material is energized prior to the starting of the engine, the combustion chamber will be heated sufficiently to ignite and burn the fuel the instant it is injected into the engine, the arrangement being such that a plurality of hot points or surfaces are provided within the combustion chamber. The invention further consists in the provision of means carried by the power piston for distributing and spraying the fuel against the hot points of the annulus, plate, or wire, so that, the fuel will be ignited at a plurality of points within the combustion chamber, thus not only insuring ignition of the fuel, but the consequent complete burning thereof as it is injected into the combustion chamber. The invention still further consists in arranging a control in the source of electric energy, so that, after the annulus, plate, or wire, has become iridescent from the heat generated by the explosions and burning of the fuel, the current may be reduced or completely cut off, and economy thus effected in the operation of the engine, it being understood, that the annulus, plate, or wire, of high resistance material will absorb the heat generated in the combustion chamber sufficiently to ignite the fuel as it is injected into the engine and comes into contact with the high resistance material.

These and other features germane thereto constitute the invention as will be hereinafter fully described and then claimed.

In the drawings, illustrating the invention, in the several figures of which like parts are similarly designated, Figure 1 is a vertical section of the upper end of the power cylinder of an internal combustion engine, the piston being shown in elevation. Fig. 2 is a horizontal section of the same drawn on the line *a—a* of Fig. 1, looking in the direction indicated by the arrows. Fig. 3 is a sectional elevation of the upper end of the power piston illustrating the action of the fuel distributer carried by the piston, and the manner in which the fuel is directed against the flanged ring in the cylinder. Fig. 4 is a plan view of the central portion of the upper end or head of the piston. Fig. 5 is a partly sectional side view illustrating a slightly modified construction. Fig. 6 is a vertical section drawn through the central portion of the head of the cylinder, illustrating a slightly different arrangement of heating the fuel injector. Figs. 7 and 8 are horizontal sections also drawn on the line a—a of Fig. 1, illustrating a different arrangement of the high resistance material arranged in the combustion chamber of the cylinder. Fig. 9 is a vertical section drawn through the upper end of the cylinder illustrating still another arrangement for heating the fuel before it is injected into the combustion chamber of the engine, and a further construction of the annulus of high resistance material arranged within the combustion chamber of the engine.

1 designates the power cylinder provided, as shown, with a water-jacket 2. The head 3 of the cylinder is also formed with a water-jacket 4, and with a central, upwardly extending collar 5 in which is mounted the fuel injector 6, substantially of the construction shown in my co-pending application, filed March 7, 1914, Serial No. 823,172, but which may be of any approved construction. As I do not make special claim to the specific construction of the injector, I do not think it necessary to illustrate the same in this application. The injector is surrounded by a suitable insulating sleeve 7, and surrounding the sleeve 7 is a sleeve 7' of high resistance material, which in turn is surrounded by a sleeve 8. The sleeve 7' is formed or connected with terminals 7'', which are insulated from the collar 5, as shown. As shown, the upper end of the collar 5 is formed with short slots to receive the insulating terminals 7'' and their insulating covers to facilitate the insertion and withdrawal of the injector and its surrounding members respectively into and from the bore of the collar 5.

The head of the cylinder is also provided with diametrically oppositely disposed bores 3', in which are held plugs 9 of porcelain or other suitable insulating material capable of withstanding high pressures and high heat, and extending through the plugs 9 are stud bolts 10, (shown in Figs. 1, 2, and 9), to the inner ends of which is connected a flanged ring 11 of "nichrome," or other suitable high resistance material, the vertical and horizontal flanges of the ring 11 being provided with a plurality of apertures 12 to provide a series of hot points for igniting the fuel at a number of points around the combustion chamber of the cylinder. To the upper ends of the stud bolts are connected terminals 13 to which are connected conducting wires 14, extending from any suitable source of electric power of proper capacity for supplying the necessary current to render the ring incandescent, it being understood, that one of the stud bolts 10 is connected to the positive terminal of the source of electric power, while the other bolt is connected to the negative terminal.

Interposed in one of the wires is a rheostat 15, so that the current passing through the ring may be regulated and cut down, or completely cut out, after the ring has become iridescent or incondescent through the heat of the explosions and the burning of the fuel within the combustion chamber. It will be appreciated that after a number of explosions within the combustion chamber, the heat from the burning of the fuel will convey sufficient heat to the ring to keep it sufficiently hot to ignite the fuel as it is sprayed into the combustion chamber.

The terminals 7'' of the split sleeve 7' are connected by branch wires 70 (Fig. 1) extending respectively from the positive and negative terminals 13, so that, as the current passes through the ring 11 of high resistance material, the sleeve 7' will also be heated to thus heat the barrel of the fuel injector 6, and consequently, the fuel as it is held in and passes through the same.

Working in the power cylinder 1 is a power piston 16 having piston rings 16' of the usual construction. The piston is provided with a centrally arranged upwardly extending section 17 having a central opening 18 from which radiates a plurality of involute vertical slots 19 which open through the periphery of the extension 17; and through the top thereof, and the piston is also provided with a conical extension 20 (Fig. 3), the apex of which is arranged centrally of the opening 18, so that, as the fuel is forced out through the injector, it will strike the apex of the cone 20 and be directed outwardly through the slots 19 of the extension 17 in radial directions against the flanged ring 11, and into contact with the hot points thereof.

The piston 16 is provided with the usual connecting rod, which is connected to the crank shaft (not shown) of the engine, but as such details will be of the usual construction, and will be obvious to those skilled in the art to which the invention relates, I have not thought it necessary to show the base and crank shaft of the engine, nor the connection of the connecting rod to the crank shaft, nor have I thought it necessary to illustrate or describe the means for furnishing water to the water-jacket of the cylinder.

In Fig. 6, I show a slightly different arrangement of heating the barrel of the fuel injector 6 from that illustrated in Figs. 1 and 2 of the drawings. In this construction I provide a split band 80 of high resistance material, which is formed with a series of slots opening alternately through the upper and lower ends thereof, whereby to provide a coil, as it were, the upper and lower ends of the band being held in rings 80 of porcelain, or other suitable insulating material, so that an air chamber is provided around the barrel of the injector 6. The opposite arms or ends of the band are formed with terminals 81, which extend through slots 82 formed in the upper end of the collar 5, and are surrounded by sleeves of insulating material as shown.

As shown in Fig. 7, the stud bolts 10 are connected by a plate 111, which extends across the combustion chamber of the cylinder 1, and is provided with a central opening 112 arranged in alinement with the outlet of the fuel injector 6, and with a plurality of openings 113 providing a series of hot points for igniting the fuel as it is sprayed into the combustion chamber.

In Fig. 8, I illustrate a still further modification of heating the combustion chamber and for igniting the fuel as it is injected into the engine. In this construction, I purpose connecting the stud-bolts 10 by a wire ring 114 having lateral extensions 115, which are arranged over the inner ends of the stud bolts, the extensions 115 being held in place by washers 116 and nuts 117 threaded upon the lower ends of the bolts.

In Fig. 9, I illustrate a still further construction of the ring or annulus. In this arrangement, it will be seen the ring or annulus 11' is formed substantially U-shape in cross-section. Also, in this construction, I surround the barrel of the injector 6 with an insulating sleeve 90 of suitable material, and I extend branch wires 91 from the positive and negative terminals 13, and connect the said wires 91 to the oil and air inlet pipes of the fuel injector 6 at suitable points from the latter so as to heat the said pipes and consequently the oil and the air as the latter pass to the injector. In this construction, I rely upon the heat of the combustion chamber for heating the inner end of the fuel injector sufficiently to heat the barrel thereof, and the fuel, as it passes through the barrel.

In operation, current of proper capacity is supplied to the heating element to make it iridescent or incandescent, so that, when the fuel is injected into the combustion chamber, it will be sprayed in radial directions, and forced against the hot points of the heating element, and thus instantly ignited and burned, it being understood, of course, that the gearing of the engine will be regulated so that the fuel will be injected into the combustion chamber when the power piston 16 is at or near the end of its return stroke, the time of injecting the fuel into the engine being regulated by the grade of fuel oil used. After the combustion chamber has become thoroughly heated, through the heat generated by the burning of the fuel, and when the heating element has become iridescent, the supply of current furnished to the heating element may then be "cut down", or reduced, since a smaller amount of current would naturally be required to keep the heating element iridescent, owing to the fact that the same will absorb heat from the heat generated within the combustion chamber, and as the heat increases in the combustion chamber, the current may be entirely cut out, thus not only reducing the cost of operating the engine, but consequently increasing the efficiency of the engine, since the power required for generating the electric current, or for restoring the current in the event of the latter being supplied through storage batteries, is thus eliminated.

From the foregoing, it will be seen that I provide an exceedingly simple and efficient device, which will not only avoid the use of sparking-plugs in light or heavy oil engines, but also a construction in which a plurality of hot points or igniting points are arranged entirely around the combustion chamber of the engine which will insure instant ignition and complete burning of the fuel throughout the entire space of the combustion chamber.

While I have shown the extension 17 and the cone 20 formed integral with the head of the power cylinder, it will be understood that the extension and the said cone may be formed of separate pieces having a flanged base 27 which may be set into a recess formed in the top of the power cylinder, as shown in Fig. 5, or bolted direct upon the top of the piston.

I desire it understood, that while I prefer to employ a flanged ring in the combustion chamber to supply the necessary heating element, it will be appreciated that various modifications, such as is shown in Figs. 7 and 8, may be employed to equal advantage without departing from the spirit or scope of the invention, and I therefore, do not want to be limited to the employment of the flanged ring or annulus, since the broad idea is to provide sufficient heat surfaces within the combustion chamber to raise the temperature of compression therein, combined with a series of hot points which will insure the ignition of the fuel as it is injected into the combustion chamber, the arrangement being such that the fuel is ignited at a plurality of points instead of only one point, as with the use of sparking-plugs now commonly employed in this class of engines.

I desire it further understood, that by my peculiar arrangement of a heating element within the combustion chambers of internal combustion engines, I am also able to transmit heat to the fuel injector, or to the oil and air supply pipes leading thereto, whereby the oil and air may be heated before entering the combustion chamber, and hence rendered more susceptible to ignition when injected into the engine.

What I claim is:—

1. In an internal combustion engine, a power cylinder having an annulus arranged in the combustion chamber thereof having openings providing a plurality of ignition points, and means to supply electric energy to said annulus, for the purpose specified.

2. In an internal combustion engine, a power cylinder having a flanged ring arranged in the combustion chamber thereof, said flanged ring having a plurality of openings providing ignition points, and means to supply electric energy to said flanged ring.

3. In an internal combustion engine, a power cylinder having a multi-jet igniter of high resistance material arranged in the combustion chamber of said cylinder, means to supply fuel to the combustion chamber within the zone of influence of said igniter, a power piston operating in said cylinder and having a fuel distributer at its upper end relatively arranged with respect to said igniter to distribute the fuel to said igniter, and means to supply electric current to said igniter to heat it sufficiently to cause combustion of the fuel so supplied to it.

4. In an internal combustion engine, a power cylinder, a perforated annulus of high resistance material arranged in the combustion chamber thereof, means to supply electric energy to said annulus for the purpose specified, means to supply fuel to said combustion chamber, and a piston operating in said power cylinder having a distributer at its upper end for directing the fuel toward said annulus as it is injected into the combustion chamber.

5. In an internal combustion engine, a power cylinder, a flanged ring of high resistance material supported in the combustion chamber of the cylinder, said flanged ring having a plurality of perforations or openings providing ignition points, means to supply electric energy to said flanged ring, means to supply fuel to said cylinder, and a power piston operating in said cylinder and having a distributer at the upper end thereof to receive the fuel, said distributer having a plurality of fuel distributing slots to direct the fuel upon the flanged ring there to be ignited.

6. In an internal combustion engine, a power cylinder, a perforated annulus of high resistance material arranged in the combustion chamber thereof, means to supply electric energy to said annulus, means to supply fuel to said combustion chamber, and a power piston operating in said power cylinder, said piston having a deflector at its upper end for directing the fuel toward and into contact with said annulus as it is injected into the said combustion chamber.

7. In an internal combustion engine, and in combination with the cylinder and the piston, a fuel injector carried by the head of the cylinder for delivering fuel into the combustion chamber of the cylinder, an annular igniter, means for initially heating the igniter, and a fuel distributer mounted upon the piston in line with the igniter to receive the impact of the fuel jet and diffuse the same laterally in all directions toward the annular igniter.

8. In an internal combustion engine, and in combination with the cylinder and the piston, a fuel injector mounted in the head of the cylinder and arranged to deliver the fuel jet into the combustion chamber, an electrically heated igniter of annular form supported adjacent to the cylinder head and embodying a plurality of igniting points, and a fuel distributer mounted centrally upon the piston and adapted to diffuse the fuel radially in all directions against the heating points of the igniter.

9. In an internal combustion engine, and in combination with the cylinder and the piston, a fuel injector mounted in the head of the cylinder and arranged to deliver the fuel jet into the combustion chamber, an annular igniter supported by the cylinder head within the combustion chamber, and a fuel spreader having a central opening in line with the fuel jet, and having a plurality of lateral passages for delivering the fuel jet in all directions against the sides of the annular igniter.

10. In an internal combustion engine, and in combination with the cylinder and the piston, a fuel injector mounted centrally in the head of the cylinder and arranged to deliver the fuel jet axially into the combustion chamber, an annular igniter supported by the cylinder head within the combustion chamber, and a centrally disposed fuel spreader having a central opening in line with the fuel jet, and having a plurality of laterally disposed involute passages for delivering the fuel in all directions against the sides of the annular igniter.

11. In an internal combustion engine, a power cylinder having an axial opening disposed in its head, a fuel injector disposed in the axial opening, a fuel distributer arranged below said axial opening and in line therewith, and an electrically heated igniter having a plurality of igniting points and interposed between the fuel injector and the distributer.

12. In an internal combustion engine, a power cylinder having an axial opening disposed in its head, a power piston in said cylinder, a fuel injector disposed in the axial opening, a fuel distributer arranged below said axial opening and in line therewith and comprising a radially slotted projection on the piston head, and an electrically heated igniter provided with a plurality of igniting points and interposed between the distributer and the injector.

In testimony whereof I have hereunto set my hand this 29th day of October, A. D. 1915.

SIMON LAKE.

Witnesses:
MARY E. LYDDY,
M. E. HITCHCOCK.